US011630218B1

(12) United States Patent
Bentz et al.

(10) Patent No.: US 11,630,218 B1
(45) Date of Patent: Apr. 18, 2023

(54) MAPPING AND IMAGING IONIZING RADIATION IN TWO AND THREE DIMENSIONS

(71) Applicant: National Technology & Engineering Solutions of Sandia, LLC, Albuquerque, NM (US)

(72) Inventors: Brian Z. Bentz, Albuquerque, NM (US); Richard Karl Harrison, Albuquerque, NM (US); Benjamin Tong Yee, Albuquerque, NM (US); Norman Kolb, Albuquerque, NM (US); Jeffrey B. Martin, Albuquerque, NM (US); Sean Donovan Fournier, Albuquerque, NM (US); Oskar Fick Searfus, Ann Arbor, MI (US); Christopher Murzyn, Albuquerque, NM (US); Christopher Blair Saltonstall, Jr., Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 319 days.

(21) Appl. No.: 17/141,270

(22) Filed: Jan. 5, 2021

Related U.S. Application Data

(60) Provisional application No. 62/958,781, filed on Jan. 9, 2020.

(51) Int. Cl.
*G01T 1/185* (2006.01)
*G01T 1/02* (2006.01)
*G06T 11/00* (2006.01)
*G01T 1/164* (2006.01)

(52) U.S. Cl.
CPC ............ *G01T 1/023* (2013.01); *G01T 1/1648* (2013.01); *G01T 1/185* (2013.01); *G06T 11/003* (2013.01); *G06T 2207/10072* (2013.01)

(58) Field of Classification Search
CPC ....... G01T 1/023; G01T 1/1648; G01T 1/185; G06T 11/003; G06T 2207/10072
See application file for complete search history.

(56) References Cited

U.S. PATENT DOCUMENTS

| 6,207,958 B1 * | 3/2001 | Giakos | H01J 47/02 250/374 |
|---|---|---|---|
| 2008/0210878 A1 * | 9/2008 | Friedman | G01J 1/42 250/374 |

(Continued)

OTHER PUBLICATIONS

Brett, J. et al., "Spectral measurements of alpha-induced radioluminescence in varios gases," Nuclear Inst. and Methods in Physics Research, A (2017) 874:88-93.

(Continued)

*Primary Examiner* — David P Porta
*Assistant Examiner* — Fani Polyzos Boosalis
(74) *Attorney, Agent, or Firm* — Mark A. Dodd

(57) ABSTRACT

A two-dimensional imaging system and a two-dimensional or three-dimensional optical tomographic mapping system, each employing gas scintillation induced by ionizing radiation, i.e., radioluminescence, and corresponding methods, are disclosed. The systems may employ one or more cameras and corresponding UV filters (potentially solar blind filters) for imaging a radioluminescent scene. For two-dimensional or three-dimensional mapping, the resultant UV images are spatially registered with one another and then reconstructed to form a three-dimensional tomographic map of the ionizing radiation. The two-dimensional map is a plane of the three-dimensional map. The UV images may be spatially registered by using a reference source, optionally, a calibrated reference source allowing dosimetry calculations for the ionizing radiation. Molecular nitrogen is the primary candidate for the radioluminescent gas, though a controlled ambient in a chamber of nitric oxide, argon, krypton, or xenon may be employed. The reconstruction process employs an algebraic reconstruction technique or an Abel inversion.

15 Claims, 4 Drawing Sheets

(56) References Cited

U.S. PATENT DOCUMENTS

2017/0146787 A1* 5/2017 Reed ............... G01N 23/225
2021/0055431 A1* 2/2021 Knowland ............ G01T 1/1612

OTHER PUBLICATIONS

Crompton, A. J. et al., "Gas Flow to Enhance the Detection of Alpha-Induced Air Radioluminescence Based on a UVTron Flame Sensor," Sensors (2018) 18:1842, 11 pages.

Goulet, M. et al., "Novel, full 3D scintillation dosimetry using a static plenoptic camera," Med. Phys. (2014) 41(8):82101-1-082101-13.

Kerst, T. et al., "Intense radioluminescence of NO/N2-mixture in solar blind spectral region," Optics Express (2018) 26(26): 33764-33771.

Li, T. et al., "Tomographic imaging of OH laser-induced fluorescence in laminar and turbulent jet flames," Meas. Sci. Technol. (2018) 29:015206, 10 pages.

Mailloux, G. E. et al., "Deriving the Multiplicative Algebraic Reconstruction Algorithm (MART) by the Method of Convex Projections (POCS)," 1993 IEEE International Conference on Acoustics, Speech, and Signal Processing, Apr. 27-30, Minneapolis, MN, 4 pages.

Soloff, S. M. et al., "Distortion compensation for generalized stereoscopic particle image velocimetry," Meas. Sci. Technol. (1997) 8:1441-1454.

\* cited by examiner

MAPPING AND IMAGING IONIZING RADIATION IN TWO AND THREE DIMENSIONS

RELATED APPLICATIONS

This application claims priority to U.S. Provisional Application No. 62/958,781, filed on Jan. 9, 2020, and entitled MAPPING IONIZING RADIATION IN THREE DIMENSIONS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to systems and methods that generate two-dimensional (2D) images and 2D or three-dimensional (3D) tomographic maps of ionizing radiation using UV, including solar blind, imaging.

BACKGROUND

Ionizing radiation is radiation that carries enough energy to detach electrons from atoms or molecules, thereby ionizing them. Ionizing radiation is made up of energetic subatomic particles, ions, or atoms moving at high speeds, and electromagnetic waves on the high-energy end of the electromagnetic spectrum. Alpha particles, gamma rays, X-rays, and the higher ultraviolet (UV) part of the electromagnetic spectrum are ionizing radiation, whereas the lower UV part of the electromagnetic spectrum and all the spectrum below UV, including visible light (including nearly all types of laser light), infrared, microwaves, and radio waves, are considered non-ionizing radiation. The boundary between ionizing and non-ionizing electromagnetic radiation that occurs in the UV is not sharply defined, since different molecules and atoms ionize at different energies. A conventional definition places the boundary at a photon energy between 10 eV and 33 eV in the UV.

Typical ionizing subatomic particles found in radioactive decay include alpha particles, beta particles, and neutrons. Almost all products of radioactive decay are ionizing because the energy of radioactive decay is typically far higher than that required to ionize most molecules and atoms. Other subatomic ionizing particles which occur naturally are muons, mesons, positrons, and other particles that constitute the secondary cosmic rays that are produced after primary cosmic rays interact with Earth's atmosphere. Cosmic rays are generated by stars and certain celestial events such as supernova explosions. Cosmic rays may also produce radioisotopes on Earth (for example, carbon-14), which in turn decay and produce ionizing radiation. Cosmic rays and the decay of radioactive isotopes are the primary sources of natural ionizing radiation on Earth referred to as background radiation. Ionizing radiation can also be generated artificially by X-ray tubes, particle accelerators, and any of the various methods that produce radioisotopes artificially.

Ionizing radiation is typically not directly detectable by human senses, so radiation detection instruments such as Geiger counters must be used to indicate its presence and measure its intensity. However, ionizing radiation at high intensities can cause emission of visible light upon interaction with matter, such as in Cherenkov radiation and radioluminescence.

Ionizing radiation is used in a wide variety of fields such as medicine (both imaging and treatment), nuclear power, research, manufacturing (typically sterilization), construction, and many other areas. This ionizing radiation presents a health hazard if proper measures against undesired exposure are not followed. Exposure to ionizing radiation causes damage to living tissue, and can result in radiation burns, cell damage, radiation sickness, cancer, and even death. For these reasons, detecting the presence and intensity of ionizing radiation, including its 2D or 3D profile, is very important in many scenarios.

In several applications, ionizing radiation may take the form of a beam. However, measuring the flux of the beam as a function of position, for example to generate a 3D tomographic map of the beam, is difficult and time consuming. One way of generating this 3D tomographic map of an ionizing radiation beam requires placing hundreds or perhaps thousands of thermoluminescent dosimeters (TLDs) on wires that are then suspended within the beam, thereby creating a 3D array of the TLDs. After exposure to the ionizing radiation beam, the time-integrated detected exposure of each of the TLDs is recorded, typically by hand, and then entered into a database. This process, depending upon the number of TLDs employed, can easily take a day or more and will have limited spatial and temporal resolution.

In another prior art approach, a solid scintillator, in the form of a volume of plastic, frequently termed a "phantom," was employed to map ionizing radiation using a plenoptic (or light field) camera. See M. Goulet et al., "Novel, full 3D scintillation dosimetry using a static plenoptic camera," Medical Physics, vol. 41, art. no. 082101 (2014), the contents of which are incorporated herein by reference. This approach, however, is limited by the need to place the solid scintillator or phantom within the volume to be mapped. This is impractical if the volume to be imaged is large, cannot readily permit the insertion of a solid scintillator (which may have a substantial mass and can act as a shield or potentially perturb the radiation), or the imaging system must be portable.

Due to the nature of some forms of ionizing radiation, one may need both spatial and temporal resolution. To that end, for example, a Geiger counter or PIN diode may provide temporal resolution, but as point-like detectors, neither provide any useful spatial resolution. Conversely, a two-dimensional array of TLDs or radiochromic film, i.e., film that responds directly to the ionizing radiation, may provide the needed spatial resolution, but both provide poor temporal resolution.

Thus, the need exists for a more practical and faster system and method for generating 2D images and both 2D and 3D tomographic maps of ionizing radiation with the requisite spatial and temporal resolution.

SUMMARY

One aspect of the present invention relates to a system and method for creating a 3D tomographic map of ionizing radiation based upon gas scintillation, i.e., radioluminescence of the excited gas. The system includes one or more cameras sensitive to the wavelength of the radioluminescence, for example, by using a narrowband filter. The one or more cameras take a series of UV images of the radioluminescence and of a reference source. The resulting UV images are then processed to create a 3D tomographic map of the ionizing radiation. One may then specify a plane within the 3D tomographic map and generate a corresponding 2D map of the ionizing radiation.

Another aspect of the present invention relates to a system and method for creating a 2D image of ionizing radiation based upon radioluminescence. The system includes a single camera sensitive to the wavelength of the radioluminescence. The camera takes a UV image of the radioluminescence and, optionally, of a reference source. The resulting UV image may then be processed to create a 2D image of the ionizing radiation.

Various gas species are known to radioluminesce when subjected to ionizing radiation. As an example, molecular nitrogen in ambient air is known to weakly emit UV light in the presence of ionizing radiation, at a rate of ~17 UV photons per MeV of ionizing radiation deposited in ambient air. While other gas species possess higher radioluminescence rates, i.e., more photons per MeV of ionizing radiation, molecular nitrogen is of great interest as it comprises 78% of ambient air. In contrast, other gas species are only present at significantly lower concentrations in ambient air or would need to be introduced into the test atmosphere. This weak radioluminescence can be challenging to observe because of the natural background light that is also present in the UV. For this reason, certain embodiments of the present invention operate in the solar blind portion of the UV spectrum.

In at least one embodiment of the present invention, an optical tomographic mapping system for mapping ionizing radiation comprises at least one camera (each of the at least one camera responsive to UV radioluminescence induced by the ionizing radiation, each of the at least one camera outputting a corresponding UV image), and an image processor (the image processor receiving the UV images outputted by the at least one camera, the image processor including a memory that stores instructions that, when executed by the image processor, cause the image processor to perform the steps of spatially registering the UV images, and reconstructing a three-dimensional tomographic map based upon the spatially registered UV images).

In various embodiments of the present invention, each of the at least one camera includes a corresponding UV filter (each UV filter passing a wavelength or wavelength range of UV radioluminescence induced by the ionizing radiation); the UV radioluminescence is due to scintillation of a radioluminescent gas induced by the ionizing radiation (the radioluminescent gas including at least one of molecular nitrogen, nitric oxide, argon, krypton, and/or xenon); the at least one camera includes at least three cameras; the at least one camera includes one camera, and the one camera takes a plurality of UV images at a corresponding plurality of different locations, the one camera outputting the plurality of UV images; each of the at least one camera is a solar blind camera; each of the at least one camera includes a charge coupled device sensor, an intensified charge coupled device sensor, or an intensified relay optical system; and the ionizing radiation comprises at least one of energetic subatomic particles, ions, or atoms, and electromagnetic waves having a photon energy greater than substantially 10 eV.

In yet other embodiments of the present invention, the optical tomographic mapping system further comprises a reference source, each UV image includes an image of the reference source, an operational wavelength of the reference source includes at least one radioluminescence line of the UV radioluminescence, and the step of spatially registering the UV images is adapted to employ a location of the reference source in each of the UV images; the reference source is an absolute reference source, the absolute reference source providing a calibrated output power, and the three-dimensional tomographic map is an absolute power three-dimensional tomographic map; and the step of reconstructing a three-dimensional tomographic map further includes a step of integrating the absolute power three-dimensional tomographic map to determine a total dose of the ionizing radiation.

In still other embodiments of the present invention, the step of reconstructing a three-dimensional tomographic map employs an algebraic reconstruction technique, a multiplicative algebraic reconstruction technique, a simultaneous multiplicative algebraic reconstruction technique, or an Abel inversion; the step of reconstructing a three-dimensional tomographic map includes at least one preprocessing step, the at least one preprocessing step including background intensity subtraction, image normalization, and/or spatial filtering; and the optical tomographic mapping system further comprises a chamber (the chamber is a fixed chamber or a portable chamber), and the chamber includes a radioluminescent gas, the radioluminescent gas comprising molecular nitrogen, nitric oxide, argon, krypton, and/or xenon.

In at least one embodiment of the present invention, a method for generating a three-dimensional tomographic map of ionizing radiation comprises the steps of taking one or more UV images of a desired volume (each of the one or more UV images indicating radioluminescence due to the presence of ionizing radiation, each of the one or more UV images taken from a corresponding different location), spatially registering the one or more UV images, and image processing the one or more spatially registered UV images using an algebraic reconstruction technique, a multiplicative algebraic reconstruction technique, a simultaneous multiplicative algebraic reconstruction technique, or an Abel inversion to generate the three-dimensional tomographic map of the ionizing radiation.

In at least one embodiment of the present invention, a method for generating a two-dimensional image of ionizing radiation comprises the steps of providing a chamber, placing a source of the ionizing radiation adjacent the chamber, introducing a UV radioluminescent gas into the chamber, and taking a two-dimensional UV image of a UV radioluminescence induced by the ionizing radiation with a solar blind camera, thereby generating the two-dimensional image of ionizing radiation.

In other embodiments of the present invention, the UV radioluminescent gas includes molecular nitrogen, nitric oxide, argon, krypton, and/or xenon; the solar blind camera includes a charge coupled device sensor, an intensified charge coupled device sensor, and/or an intensified relay optical system; the ionizing radiation comprises energetic subatomic particles, ions, or atoms, and/or electromagnetic waves having a photon energy greater than substantially 10 eV; and the chamber is a fixed chamber or a portable chamber.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
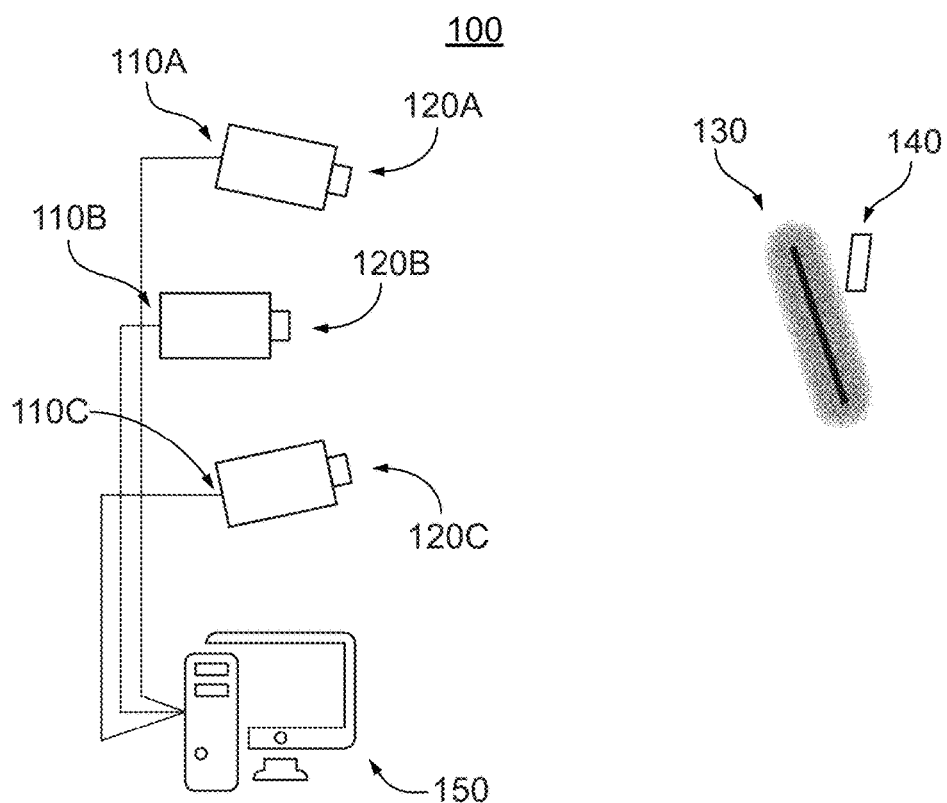
FIG. 1 illustrates an optical tomographic mapping system in accordance with one or more embodiments of the present invention.

FIG. 1 illustrates an optical tomographic mapping system 100 in accordance with one or more embodiments of the present invention. The optical tomographic mapping system 100 includes three cameras 110A, 110B, 110C. Each of the cameras 110A, 110B, 110C includes a corresponding UV filter 120A, 120B, 120C. The UV filters 120A, 120B, 120C pass the wavelength, or wavelength range, of radioluminescence induced by the ionizing radiation 130. A reference source 140 is located within the field of view of each of the three cameras 110A, 110B, 110C. The UV images taken by the three cameras 110A, 110B, 110C are sent to an image processor 150. The image processor 150 spatially registers the UV images based upon the reference source 140 and then applies a 3D tomographic reconstruction algorithm to the UV images to create the 3D tomographic map of the ionizing radiation. If an absolute 3D tomographic map is desired, then the image processor 150 further scales the 3D tomographic reconstruction based upon a calibrated reference source 140.

The cameras 110A, 110B, 110C may employ an array of any type of sensor element that is responsive to UV radiation, or a single element detector that may be scanned. As an example, the cameras 110A, 110B, 110C may employ a thinned, backside illuminated silicon (Si) charge coupled device (CCD) sensor array as these are known to be directly sensitive to UV radiation in the preferred wavelength range of interest (300-400 nm). The UV response of these sensor arrays can be improved by using an appropriate anti-reflection coating on the sensor array. The optics of the cameras 110A, 110B, 110C, including any lenses and mirrors, are preferably highly UV efficient due to the relatively low number of UV photons generated by the ionizing radiation 130.

If the ionizing radiation 130 will be of very short duration or will occur at a specific time, the cameras 110A, 110B, 110C may optionally employ an intensified charge coupled device (ICCD). An ICCD typically includes a photocathode, a micro-channel plate, and a phosphor screen, all located in front of a CCD sensor array, forming a single device. By turning on and off, i.e., gating, the micro-channel plate so that it coincides with the timing of the ionizing radiation 130, the noise due to background radiation may be minimized. Certain other embodiments of the present invention employ a multi-anode photomultiplier tube for sensing the UV radiation. Still other embodiments of the present invention employ an intensified relay optical system in conjunction with the cameras 110A, 110B, 110C. The intensified relay optical system may include, for example, a photocathode, a micro-channel plate, and a phosphor screen, but no sensor array, and thus must be used in conjunction with the cameras 110A, 110B, 110C. Due to the wavelength conversion by the intensified relay optical system, the cameras 110A, 110B, 110C need not be sensitive to UV radiation and visible light cameras may be employed.

From a timing standpoint for embodiments employing an intensified relay optical system, image acquisition by the cameras 110A, 110B, 110C may begin before the intensified relay optical system is gated on. The intensified relay optical system will be gated on from a few nanoseconds to a few microseconds to coincide with the timing of the ionizing radiation 130. Once the intensified relay optical system has been gated off, image acquisition by the cameras 110A, 110B, 110C may end, with the total image acquisition (or exposure) time of the cameras 110A, 110B, 110C being on the order of milliseconds. A controller, which may include one or more delay generators, will likely be required to ensure proper timing between the cameras 110A, 110B, 110C, the intensified relay optical system, and the source of the ionizing radiation 130.

The use of ICCDs or intensified relay optical systems in conjunction with the cameras 110A, 110B, 110C may offer at least one significant benefit. If the ionizing radiation is weak, non-intensified camera systems may require a very long integration time. In contrast, ICCDs and intensified relay optical systems in conjunction with the cameras 110A, 110B, 110C, due to their gain, permit far shorter integration times, thereby reducing the time required to generate the desired 2D image, 2D map, or 3D tomographic map.

While the optical tomographic mapping system 100 illustrated in FIG. 1 includes three cameras 110A, 110B, 110C, three cameras are not required. As will be appreciated by those of ordinary skill in the art, additional cameras may be employed to produce a higher fidelity 3D tomographic map. The exact number of cameras in the system will generally be an engineering tradeoff as more cameras will require greater computational power and memory in the image processor 150. A further alternative is a plenoptic (light field) camera, in which a single plenoptic camera can take a single image that captures spatial information allowing 3D reconstruction of the imaged scene.

The cameras 110A, 110B, 110C may be placed at fixed locations if the optical tomographic mapping system 100 is used at a single location, for example, as part of a final qualification step at a facility producing equipment that emits or is subjected to ionizing radiation. In other embodiments of the present invention, the cameras 110A, 110B, 110C may be mounted on a mounting tree with arms that support the cameras 110A, 110B, 110C such that the optical tomographic mapping system 100 may be used as a portable radiation safety system. A portable radiation safety system may be employed, for example, in a nuclear power plant, with its miles of tubing and numerous potential sources of ionizing radiation leakage. A portable radiation safety system may also be employed as part of a periodic certification or safety process for ionizing radiation producing equipment in the field, such as a doctor's or dentist's x-ray system or a cancer treatment center's radiation system.

Figure 2:
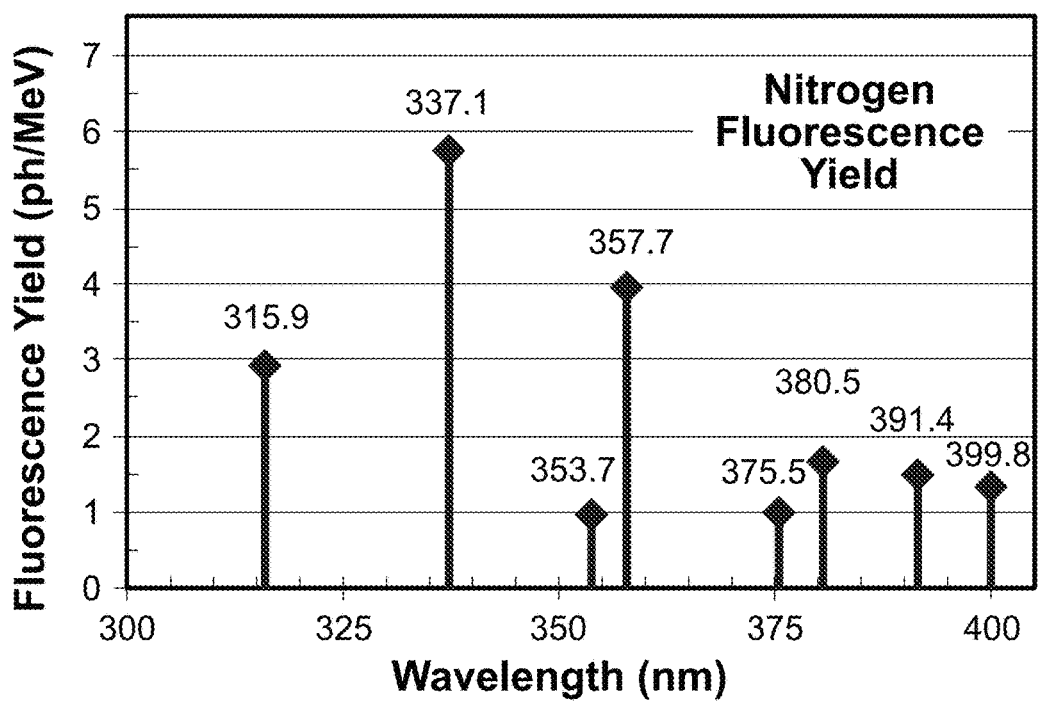
FIG. 2 illustrates the scintillation yield for molecular nitrogen over the UV wavelength range of 300 nm to 400 nm.

The UV filters 120A, 120B, 120C may be of any type that passes the wavelength, or wavelength range, of the radioluminescence, while substantially blocking wavelengths outside of this wavelength or wavelength range. FIG. 2 illustrates the scintillation yield for molecular nitrogen in ambient air at atmospheric pressure at sea level over an exemplary wavelength range of 300 nm to 400 nm. If the UV filters 120A, 120B, 120C are bandpass filters with a passband of 300 nm to 400 nm, then the radioluminescing molecular nitrogen will emit approximately 17 UV photons in this passband. Narrower bandpass filters, for example, ones that pass two or more of the radioluminescence lines of molecular nitrogen may be employed in certain embodiments of the present invention. To the extent there are other sources of radiation in this broad passband, creating a significant background signal, a narrowband filter may alternatively be employed. For example, a narrowband filter centered at 337 nm will pass the 337 nm radioluminescence line of molecular nitrogen, but will block most of the background signal.

As an alternative to the combination of the cameras 110A, 110B, 110C and corresponding UV filters 120A, 120B, 120C, certain embodiments of the present invention may use "solar blind" cameras, which operate in the deep UV-C (<280 nm) range. A significant advantage to operating in the solar blind wavelength region is that it is nearly background noise free as natural backgrounds have virtually no light in this wavelength region and very few man-made sources produce light in this region.

While molecular nitrogen may be the preferred radioluminescent gas for atmospheric operation, i.e., operation in ambient air, other gases may be employed. One alternative is a nitrogen ambient with a trace of oxygen, such as might be created with "house nitrogen" as opposed to high purity nitrogen, in which ionizing radiation may generate nitric oxide, a high photon yield radioluminescent gas. This nitric oxide approach offers the advantage that its radioluminescence lines at 225 nm, 235 nm, 246 nm, 258 nm, and 272 nm are all in the solar blind wavelength region, with its attendant extremely low background noise. See T. Kerst and J. Toivonen, "Intense radioluminescence of $NO/N_2$-mixture in solar blind spectral region," Optics Express, vol. 26, no. 26, pp. 33764-33771 (2018), the contents of which are incorporated herein by reference. Still other alternatives include argon (which has a line at 312 nm, see J. Brett et al., "Spectral measurements of alpha-induced radioluminescence in various gases," Nuclear Instruments and Methods in Physics Research, A 874, pp. 88-93 (2017), the contents of which are incorporated herein by reference), and krypton and xenon, (which have lines at 150 nm and 175 nm, respectively, see A. J. Crompton et al., "Gas Flow to Enhance the Detection of Alpha-Induced Air Radioluminescence Based on a UVTron Flame Sensor," Sensors, vol. 18, art. no. 1842 (2018), the contents of which are incorporated herein by reference).

Due to the low concentrations of argon, krypton, or xenon, or the unoptimized mixture of nitrogen with just a trace of oxygen, in the ambient air, a chamber filed with the desired high photon yield radioluminescent gas may be employed in certain embodiments of the present invention. The chamber may, for example, take the form of a room, i.e., a fixed chamber, in which the source of the ionizing radiation is placed. The room is then filled with the desired radioluminescent gas. In other embodiments, the chamber may be a portable chamber and take, for example, the form of a "balloon," which is filed with the desired radioluminescent gas, subject to the portable chamber being reasonably transparent to the ionizing radiation and to the radioluminescent line(s). The portable chamber is then placed in the desired location within the ionizing radiation.

While the optical tomographic mapping system 100 illustrated in FIG. 1 is based upon UV emission lines, ionizing radiation can cause radioluminescence in the visible or near infrared (NIR). For example, molecular nitrogen will radioluminesce in the visible at 405 nm, and in the NIR at 756 nm. Other gases within ambient air also radioluminesce in the visible or NIR, including nitric oxide, argon, krypton, and xenon, though the concentrations of these four in ambient air is quite low, unless one is operating with a chamber and introduces the desired radioluminescent gas. One drawback to using a visible or NIR radioluminescence line is the much higher optical background that must be contended with.

While the illustrated embodiment includes the UV filters 120A, 120B, 120C, they are not strictly necessary. For example, one could take a first UV image without the ionizing radiation present, i.e., a background UV image, and then take a second UV image with the ionizing radiation present, i.e., a background plus radioluminescence UV image. By subtracting the first UV image from the second UV image, one is left with a UV image corresponding to only the radioluminescence. This approach allows one to directly cancel out the UV background without using a separate UV filter to block the UV background.

The present invention may be used with any type of ionizing radiation 130, provided the resultant radioluminescence is of sufficient intensity and duration to provide the desired signal-to-noise ratio. One type of ionizing radiation 130 is x-rays, both soft (having an energy less than about 10 keV) and hard (having an energy greater than about 10 keV). Sources of x-rays are prevalent in several technologies. Gamma rays, having an energy of about 100 keV or more, will also cause radioluminescence. As gamma rays are generally due to the radioactive decay of atomic nuclei, sources of gamma rays are less numerous than those for x-rays. Despite being less common, the need for 3D tomographic mapping of gamma ionizing radiation may be greater due to the greater potential harm from these sources. Alpha particles, which generally have an energy between 4 and 6 MeV, are associated with exceptionally high dose rates in the small region near where they are emitted. Consequently, alpha particle-emitting radioactive material is well suited for detection by imaging of its corresponding radioluminescence.

Radioluminescence in ambient air primarily occurs as a product of the excitation and relaxation of molecular nitrogen (or other gas species) by the ionizing radiation 130. Due to the very rapid relaxation time, an excited molecule is not expected to travel far before it relaxes. Therefore, the volumetric radioluminescence can be considered proportional to the three-dimensional ionizing radiation dose field.

The reference source 140 may be one of two types, a relative reference source or an absolute reference source. Both types of reference sources serve as a spatial or locational reference in the optical tomographic mapping system 100. Specifically, both types of reference sources can be used to establish the precise locations of the cameras 110A, 110B, 110C, a requirement if their corresponding UV images are to be used to generate the 3D tomographic map of the ionizing radiation 130.

The output power of the reference source 140 need not be constant if it is only a relative reference source. However, if the reference source 140 is an absolute reference source, its calibrated output power allows the radioluminescence sensed by the cameras 110A, 110B, 110C to be scaled such that the resultant 3D tomographic map provides absolute, rather than relative, power values. Such absolute power values may be required, for example, in medical physics applications where very specific therapeutic doses are required for a prescribed treatment. In addition, these applications may require calibrating the relative efficiency of different ionizing radiation particles or energies, and how the measured ionizing radiation intensity corresponds to the desired therapeutic dose.

The reference source 140 may be any type of source the cameras 110A, 110B, 110C can sense. In a preferred embodiment, the reference source 140 is a UV source having an operational wavelength corresponding to the wavelength of the radioluminescing gas. For example, if molecular nitrogen is to be used as the radioluminescing gas, the operating wavelength of the reference source 140 may be 337 nm.

Figure 3:
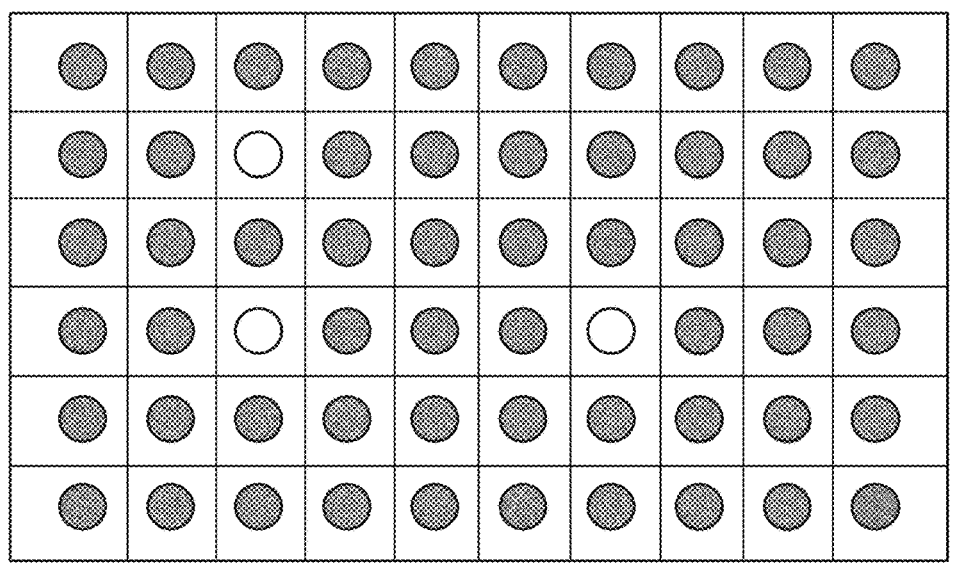
FIG. 3 illustrates an exemplary reference source for use with one or more embodiments of the present invention.

Examples of potential reference sources 140 include UV LEDs or glow discharge tubes (or even a gas laser) filled with the radioluminescing gas. In either case, some type of feedback control would be required to keep the output power constant at a predetermined power level if the reference source 140 is to be an absolute reference source. The output from a UV LED is typically directional, for example, it may have a Lambertian (cosine) distribution as a function of angle, depending upon the orientation of the UV LED. If the output is directional, the signal received by each of the cameras 110A, 110B, 110C will vary according to their positions, i.e., angles. One may compensate for this directional output variation electronically by multiplying the signal received by each of the cameras 110A, 110B, 110C by a correction factor based, for example, on the angle of the cameras 110A, 110B, 110C. Alternatively, one may place various optical elements in front of the UV LED that produce a uniform output (irradiance) regardless of viewing angle. One way to avoid the need for angular compensation is to employ a glow discharge tube with its long axis approximately normal to the plane formed by the optical axes of the cameras 110A, 110B, 110C. An exemplary reference source 140 is illustrated in FIG. 3 having a two-dimensional arrangement of lines and/or optical sources, for example, UV LEDs.

The reference source 140 is optional when the positions of the cameras 110A, 110B, 110C are known a priori. The positions of the cameras 110A, 110B, 110C may be known a priori when the optical tomographic mapping system 100 is fixed, for example, when the optical tomographic mapping system 100 is used in a dedicated room and the positions of the cameras 110A, 110B, 110C do not change. This may be the case when the optical tomographic mapping system 100 is used for quality control purposes of ionizing radiation producing equipment as the equipment rolls off an assembly line.

The accuracy of the process used to determine the locations of the cameras 110A, 110B, 110C improves when the reference source 140 covers a greater portion of the field of view of the cameras 110A, 110B, 110C. Thus, the use of a large reference source 140 is encouraged.

The image processor 150 may be any type of signal processor having enough storage and speed for the required 3D tomographic reconstruction algorithm. As the 3D tomographic reconstruction algorithm is computationally intensive, an image processor 150 having one or more graphics processing units (GPUs) is preferred.

Figure 4:
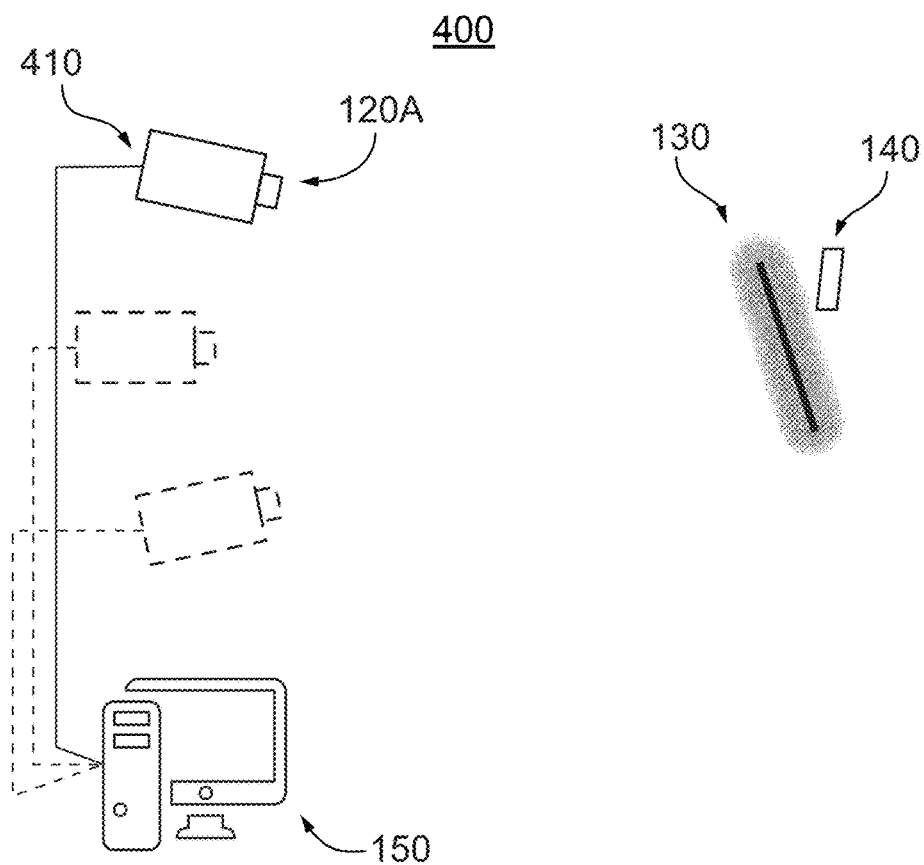
FIG. 4 illustrates an optical tomographic mapping system in accordance with one or more embodiments of the present invention.

While the optical tomographic mapping system 100 illustrated in FIG. 1 includes three cameras 110A, 110B, 110C, the optical tomographic mapping system 400 illustrated in FIG. 4 includes just a single camera 410. The remainder of the optical tomographic mapping system 400 is similar to the optical tomographic mapping system 100. However, to generate the 3D tomographic map, the single camera 410 must be moved from one location to another, with a UV image captured at each location, thereby resulting in a plurality of UV images (unless it is one of the aforementioned plenoptic cameras). The optical tomographic mapping system 400 uses the reference source 140 to identify each specific location of the camera 410, so that the plurality of UV images can be spatially registered with one another. The minimum number of UV images is two, though the more UV images taken, the higher the fidelity of the 3D tomographic map, albeit at the expense of greater computational power and memory in the image processor 150.

With the optical tomographic mapping system 100 illustrated in FIG. 1, the UV images may include the reference source 140. Alternatively, a separate set of reference images, with one taken by each of the three cameras 110A, 110B, 110C, may be employed for determining the specific locations of the three cameras 110A, 110B, 110C. In this last configuration, the ionizing radiation 130 need not be present when the reference images are taken.

Certain types of ionizing radiation may impact performance of the three cameras 110A, 110B, 110C, the ICCDs, the intensified relay optical systems, and/or the image processor 150. For example, direct gamma ray strikes on the sensors in the three cameras 110A, 110B, 110C, the ICCDs, or the intensified relay optical systems may degrade their performance by increasing the noise in the UV images. Likewise, gamma radiation may cause the image processor 150 to malfunction. The ionizing radiation may also induce electromagnetic interference (EMI), which can likewise impact performance of the three cameras 110A, 110B, 110C, the ICCDs, the intensified relay optical systems, or the image processor 150. To minimize or overcome these various impacts of ionizing radiation, the three cameras 110A, 110B, 110C, the ICCDs, the intensified relay optical systems, and the image processor 150 may be protected with shielding that blocks the ionizing radiation or the induced EMI. As the shielding will likely block the field of view of the three cameras 110A, 110B, 110C, the ICCDs, and/or the intensified relay optical systems, a corresponding set of mirrors, for example, in a periscope configuration, may be employed. This allows the three cameras 110A, 110B, 110C, the ICCDs, and/or the intensified relay optical systems, to see around the shielding.

A number of algorithms exist for implementing the 3D tomographic reconstruction. Examples include the algebraic reconstruction techniques (ART) such as the multiplicative algebraic reconstruction technique (MART) and the simultaneous multiplicative algebraic reconstruction technique (SMART) described by Atkinson and Soria, and T. Li et al. See C. Atkinson and J. Sorio, "An efficient simultaneous reconstruction technique for tomographic particle image velocimetry," Experiments in Fluids, vol. 47, pp. 553-568 (2009); and T. Li et al., "Tomographic imaging of OH laser-induced fluorescence in laminar and turbulent jet flames," Measurement Science and Technology, vol. 29, art. no. 015206 (2018), the contents of each of which are incorporated herein by reference. Software implementing SMART reconstruction is commercially available, for example, the DaVis software package from LaVision.

Figure 5:
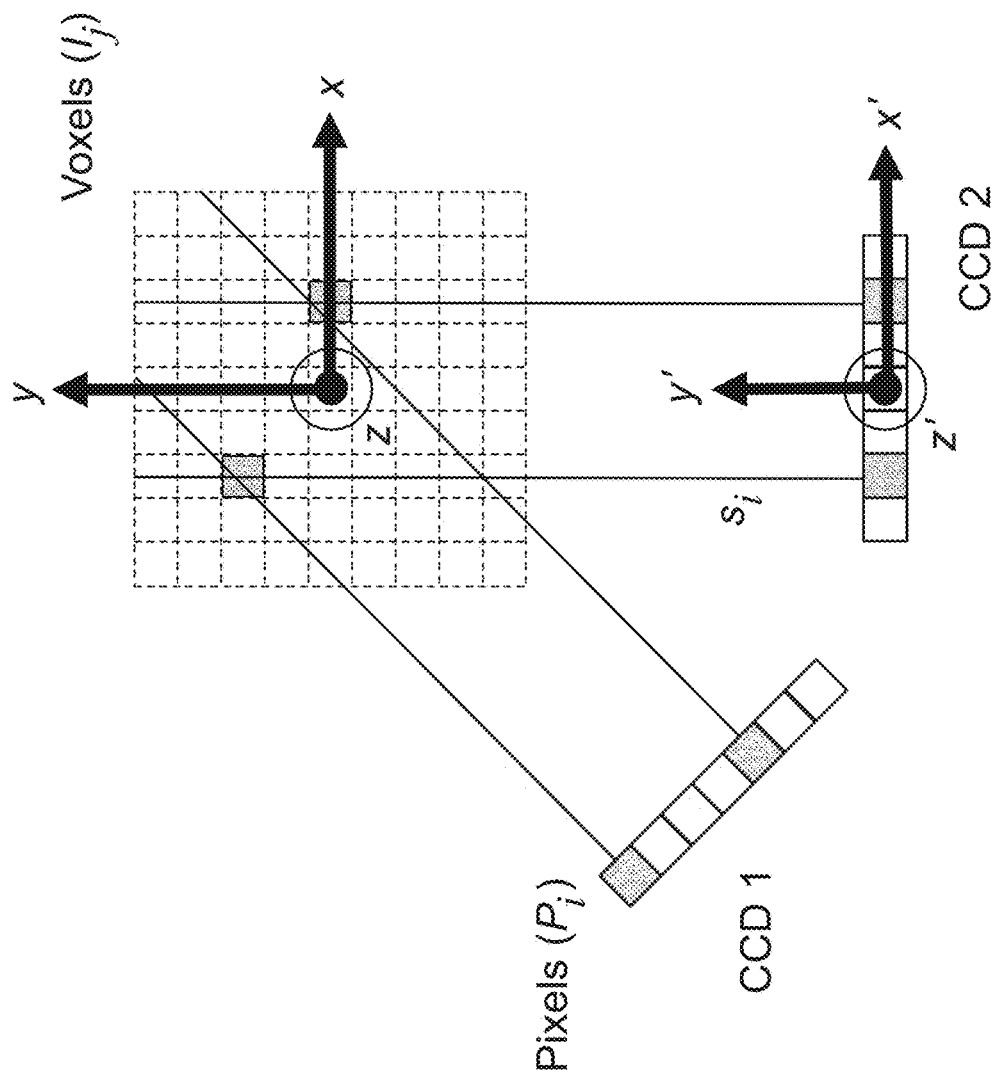
FIG. 5 illustrates the coordinate transformation utilized by algebraic reconstruction techniques that may be employed in one or more embodiments of the present invention.

The following briefly describes the MART 3D tomographic reconstruction process based upon FIG. 5. As shown in FIG. 5, the pixel intensity $P_i$ sensed by pixel i of a camera corresponds to the integrated intensity I(x,y,z) along the line of sight $s_i$ for pixel i. This is reflected in Eq. 1:

$$P_i = \int_{s_i} I(x,y,z) ds_i. \quad \text{Eq. 1}$$

When the volume being imaged is discretized into voxels j having corresponding intensities $I_j$, the pixel intensity $P_i$ from Eq. 1 becomes:

$$P_i \approx \Sigma_j W I_j, \quad \text{Eq. 2}$$

in which W is a weighting matrix that represents the contribution of each voxel j to each pixel i. Populating the elements of the weighting matrix W constitutes spatial registration of the cameras and can be accomplished several ways. For example, the coefficients of a nonlinear analytic fitting function for each element can be estimated using measurements of an exemplary reference source 140, such as that shown in FIG. 3, as described by Soloff et al. See S. M. Soloff et al., "Distortion compensation for generalized stereoscopic particle image velocimetry," Measurement Science and Technology, vol. 8, pp. 1441-1454 (1997), the contents of which are incorporated herein by reference.

The resultant image, having individual pixel intensities $P_i$, i.e., the integrated intensity I(x,y,z) along the line of sight $s_i$ for pixel i, corresponds to a 2D ionizing radiation image. This 2D ionizing radiation image is the desired output for one or more embodiments of the present invention.

With this understanding of the pixel intensity $P_i$, as sensed by the camera, one must now reconstruct the original voxel intensities $I_j$ based upon the detected pixel intensities and the known weighting matrix W. Each pixel intensity $P_i$ defines a convex set $C_i$. The original voxel intensities $I_j$ are reconstructed by iteratively projecting to each $C_i$ until the intersection of all $C_i$ is found. As an example, this iterative process for the MART approach is given by Eq. 3:

$$I_j^{k+1} = I_j^k (P_i / \Sigma_j W I_j)^{\mu W}, \quad \text{Eq. 3}$$

in which k is the iteration and μ is a relaxation constant (typically set between 0 and 2, and preferably set to 1). See G. E. Mailloux et al., "Deriving the Multiplicative Algebraic Reconstruction Algorithm (MART) by the Method of Convex Projections (POCS)," Proceedings of the IEEE International Conference on Acoustics, Speech, and Signal Processing, vol. 5, pp. 457-460 (1993), the contents of which are incorporated herein by reference. The iterative process may be continued until the difference between successive iterations is less than a predetermined threshold, or simply for a predetermined number of iterations, for example, from five to twenty. As the size of the weighting matrix W is directly proportional to both the number of camera pixels and the number of voxels in the imaged volume, the weighting matrix W can be quite large. For this reason, an image processor 150 having one or more graphics processing units (GPUs) and significant memory is preferred.

Various preprocessing steps of the pixel intensity $P_i$ may optionally be undertaken. These preprocessing steps include, for example, background intensity subtraction, image normalization, and spatial (e.g., Gaussian) filtering. These various preprocessing steps help to minimize the number of non-zero entries in the weighting matrix W, thereby reducing processing time. Furthermore, voxel subgrids defined along the line of sight $s_i$ can substantially reduce the number of weighting matrix W entries that must be computed.

Once the 3D reconstruction process is completed, one has the voxel intensities $I_j$ at each location, and a 3D tomographic map of the ionizing radiation can be created. Further, if the reference source 140 is an absolute reference source, the voxel intensities $I_j$ are absolute, not relative, power values. One can then integrate these voxel intensities and determine the total power or energy in the ionizing radiation 130 for dosimetry purposes.

Figure 6:
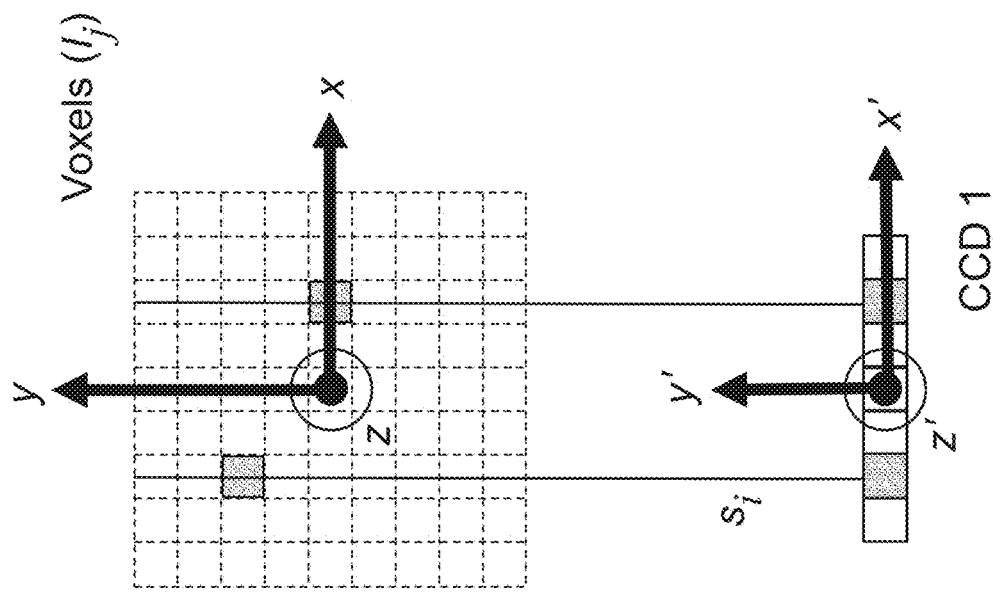
FIG. 6 illustrates the coordinate transformation utilized by an Abel inversion that may be employed in one or more embodiments of the present invention.
Figure 7:
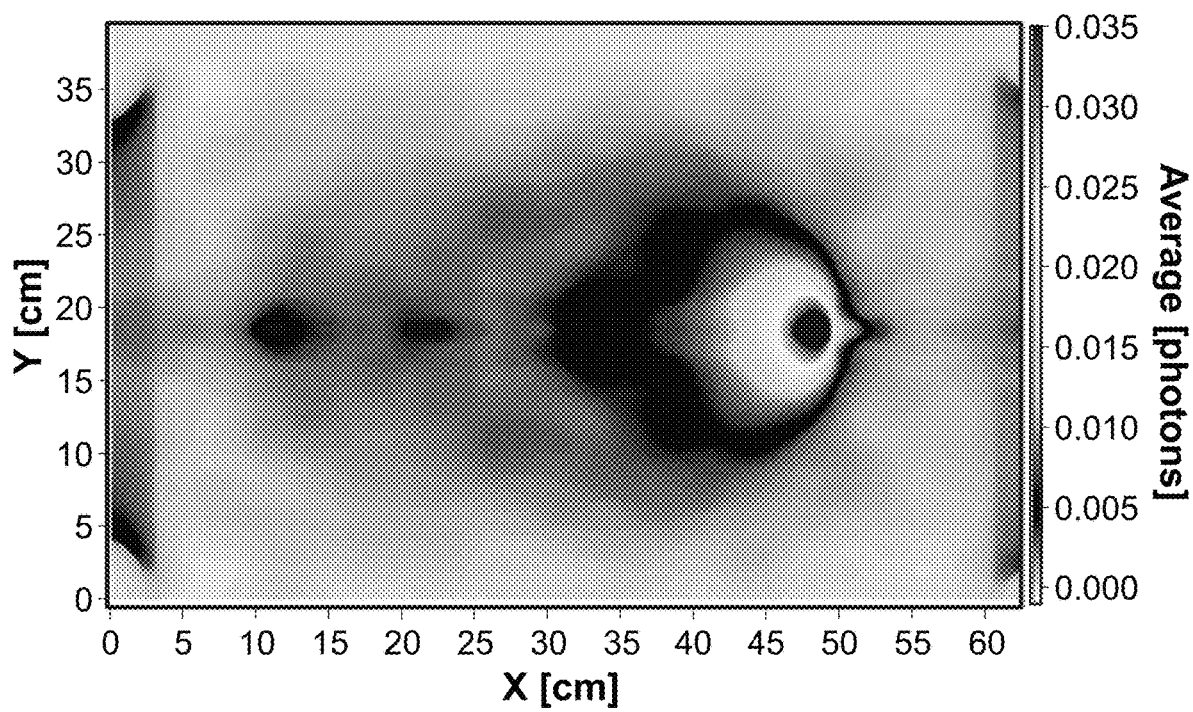
FIG. 7 illustrates a 2D ionization map, i.e., plane, taken from the 3D ionization map resulting from of an Abel transformation that may be employed in one or more embodiments of the present invention.

In some embodiments of the present invention, the Abel inversion is employed as opposed to the tomographic algebraic reconstruction technique. See E. W. Hansen and P.-L. Law, "Recursive methods for computing the Abel transform and its inverse," Journal of the Optical Society of America A, vol. 2, no. 4, pp. 510-520 (1985); and K. T. Walsh et al., "Effect of light-collection geometry on reconstruction errors in Abel inversions," Optics Letters, vol. 25, no. 7, pp. 457-459 (2000), the contents of each of which are incorporated herein by reference, for discussions on the Abel inversion. A significant advantage of the Abel inversion is that it requires only a single camera compared to the multiple cameras (or images from a single camera at multiple locations) required for the tomographic algebraic reconstruction technique. The resultant camera configuration for an Abel inversion is illustrated in FIG. 6. The drawback to the Abel transformation is that it assumes that the ionizing radiation, and thus the radioluminescence, has a radial profile that is axisymmetric, i.e. dependent on only the radius. To the extent this assumption is valid, the Abel transformation simplifies UV image acquisition. FIG. 7 illustrates a 2D ionization map, i.e., plane, taken from the 3D ionization map resulting from of an Abel transformation, clearly showing the axisymmetric radial profile.

Figure 8:
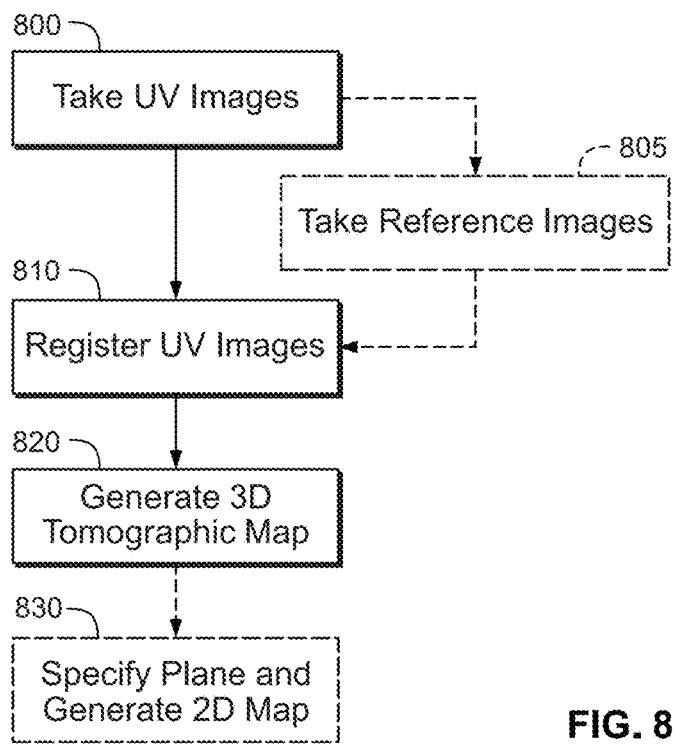
FIG. 8 illustrates the steps of a method for generating a three-dimensional tomographic map of ionizing radiation in accordance with one or more embodiments of the present invention.

When considered as a method, one embodiment of the present invention may be implemented as the steps illustrated in FIG. 8. In step 800, a series of UV images are taken of the desired volume having radioluminescence due to the presence of ionizing radiation. The series of UV images taken in step 800 may be taken by multiple cameras with UV filters, by a single camera with a UV filter moved to a series of different positions, by one or more ICCDs, or by one or more intensified relay optical systems with corresponding cameras. In step 810, the series of UV images are spatially registered with each other. In step 810, the series of UV images may be spatially registered with each other directly due to the inclusion of an image of a reference source within the series of UV images. In optional step 805, a series of reference images may be taken of the reference source, with one reference image taken by each of the cameras taking the series of UV images. If the series of reference images is taken in optional step 805, the step 810 of spatially registering the series of UV images may employ the series of reference images. In step 820, the series of spatially registered UV images are image processed using a reconstruction algorithm to generate a 3D tomographic map of the ionizing radiation. In step 820, the reconstruction algorithm may preferably be based upon algebraic reconstruction techniques such as the multiplicative algebraic reconstruction technique, the simultaneous multiplicative algebraic reconstruction technique, or the Abel transformation technique. This 3D tomographic map of the ionizing radiation is the desired output for one or more embodiments of the present invention. In optional step 830, one may specify a plane within the 3D tomographic map of the ionizing radiation to create a 2D map of the ionizing radiation in the specified plane. This 2D map of the ionizing radiation is the desired output for one or more embodiments of the present invention.

To improve the accuracy of the 3D tomographic map of the ionizing radiation, the total viewing angle of the three cameras 110A, 110B, 110C should approach 180°. The total field of view may be increased by several means. The first is to increase the number of cameras, thereby decreasing the field of view that each individual camera must cover. If a single camera is being employed, then the number of imaging locations should increase. In either case, it is anticipated that five cameras/imaging locations should provide sufficient total field of view coverage to enable reasonable fidelity of the 3D tomographic map of the ionizing radiation.

While the optical tomographic mapping system 100 illustrated in FIG. 1 may be used to create a 3D tomographic map of the ionizing radiation, some applications may require only a 2D image of ionizing radiation, for example, to determine the location of the ionizing radiation or the source of the ionizing radiation. In these 2D imaging embodiments of the present invention, only a single camera is required. As with the 3D optical tomographic mapping system 100 (that may also be used for 2D mapping), the 2D imaging system may employ a camera that is directly sensitive to UV radiation, one that is indirectly sensitive to UV radiation, for example, an ICCD, an intensified relay optical system, or a solar blind camera. As with the 3D optical tomographic mapping system 100, the 2D imaging system may also be sensitive to different sources of radioluminescence, for example, molecular nitrogen, nitric oxide, argon, krypton, and xenon. The 2D imaging system may also require the use of shielding and a set of mirrors.

Various embodiments of the present invention provide several benefits over the prior art. Among these benefits is that the ionizing radiation may be detected remotely, thereby minimizing exposure to the ionizing radiation by both the invention and its operator. This may be especially beneficial if the source of the ionizing radiation are radioactive or "hot" particles, thereby showing, for example, that decontamination is not complete. Since various embodiments of the present invention use one or more cameras, the detection is inherently directionally sensitive. In addition, various embodiments of the present invention do not require a direct line-of-sight to the source of the ionizing radiation as the scene to be imaged, for example, a UV plume of radioluminescence, can be reflected by one or more mirrors. Further, numerous types of ionizing radiation can create radioluminescence in one or more gases, thus one does not need separate sensors for each type of ionizing radiation. For medical applications, various embodiments of the present invention provide the advantage of not requiring a phantom, especially as different types of medical devices may require different types of phantoms.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An optical tomographic mapping system for mapping ionizing radiation, the optical tomographic mapping system comprising:
    at least one camera, each of the at least one camera adapted to be responsive to UV radioluminescence induced by the ionizing radiation, each of the at least one camera adapted to output a corresponding UV image; and
    an image processor, the image processor adapted to receive the UV images outputted by the at least one camera, the image processor including a memory that stores instructions that, when executed by the image processor, cause the image processor to perform the steps of:
        spatially registering the UV images; and
        reconstructing a three-dimensional tomographic map based upon the thus spatially registered UV images.

2. The optical tomographic mapping system of claim 1, wherein each of the at least one camera includes a corresponding UV filter, each UV filter adapted to pass a wavelength or wavelength range of UV radioluminescence induced by the ionizing radiation.

3. The optical tomographic mapping system of claim 1, wherein the UV radioluminescence is due to scintillation of a radioluminescent gas induced by the ionizing radiation, the radioluminescent gas including at least one of molecular nitrogen, nitric oxide, argon, krypton, and xenon.

4. The optical tomographic mapping system of claim 1, wherein the at least one camera includes at least three cameras.

5. The optical tomographic mapping system of claim 1, wherein the at least one camera includes one camera; and
    wherein the one camera takes a plurality of UV images at a corresponding plurality of different locations, the one camera adapted to output the plurality of UV images.

6. The optical tomographic mapping system of claim 1, wherein each of the at least one camera is a solar blind camera.

7. The optical tomographic mapping system of claim 1, wherein each of the at least one camera includes at least one of a charge coupled device sensor, an intensified charge coupled device sensor, and an intensified relay optical system.

8. The optical tomographic mapping system of claim 1, wherein the ionizing radiation comprises at least one of energetic subatomic particles, ions, or atoms, and electromagnetic waves having a photon energy greater than substantially 10 eV.

9. The optical tomographic mapping system of claim 1, further comprising a reference source;
    wherein each UV image includes an image of the reference source;
    wherein an operational wavelength of the reference source includes at least one radioluminescence line of the UV radioluminescence; and
    wherein the step of spatially registering the UV images is adapted to employ a location of the reference source in each of the UV images.

10. The optical tomographic mapping system of claim 9, wherein the reference source is an absolute reference source, the absolute reference source adapted to provide a calibrated output power; and
    wherein the three-dimensional tomographic map is an absolute power three-dimensional tomographic map.

11. The optical tomographic mapping system of claim 10, wherein the step of reconstructing a three-dimensional tomographic map further includes a step of integrating the absolute power three-dimensional tomographic map to determine a total dose of the ionizing radiation.

12. The optical tomographic mapping system of claim 1, wherein the step of reconstructing a three-dimensional tomographic map employs one of an algebraic reconstruction technique, a multiplicative algebraic reconstruction technique, a simultaneous multiplicative algebraic reconstruction technique, and an Abel inversion.

13. The optical tomographic mapping system of claim 1, wherein the step of reconstructing a three-dimensional tomographic map includes at least one preprocessing step, the at least one preprocessing step including one or more of background intensity subtraction, image normalization, and spatial filtering.

14. The optical tomographic mapping system of claim 1, further comprising a chamber;
wherein the chamber is a fixed chamber or a portable chamber; and
wherein the chamber includes a radioluminescent gas, the radioluminescent gas comprising at least one of molecular nitrogen, nitric oxide, argon, krypton, and xenon.

15. A method for generating a three-dimensional tomographic map of ionizing radiation, the method comprising the steps of:
taking one or more UV images of a desired volume, each of the one or more UV images indicating radioluminescence due to the presence of ionizing radiation, each of the one or more UV images taken from a corresponding different location;
spatially registering the one or more UV images; and
image processing the one or more spatially registered UV images using one of an algebraic reconstruction technique, a multiplicative algebraic reconstruction technique, a simultaneous multiplicative algebraic reconstruction technique, and an Abel inversion to generate the three-dimensional tomographic map of the ionizing radiation.

* * * * *